(No Model.)
W. R. PATTERSON.
ELECTRIC CONDUCTOR.
No. 472,643. Patented Apr. 12, 1892.
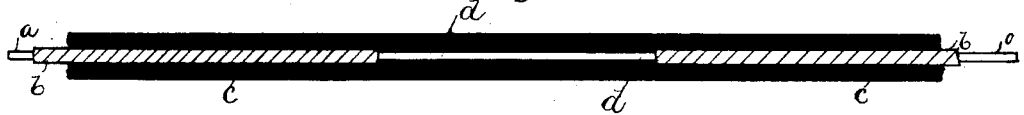
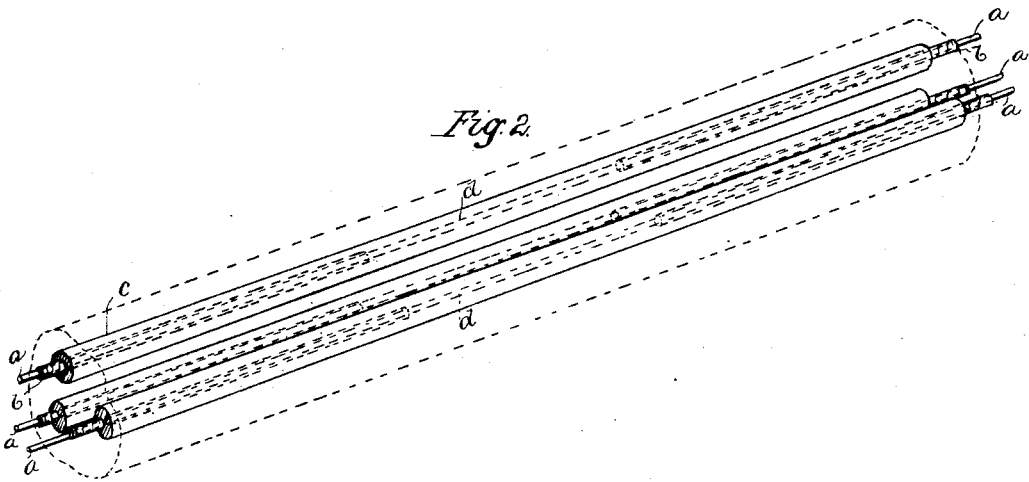
Witnesses
George L. Cragg.
Edith M. Arnold.
Inventor:
William R. Patterson
By Barton & Brown
attys.

UNITED STATES PATENT OFFICE.

WILLIAM R. PATTERSON, OF CHICAGO, ILLINOIS.

ELECTRIC CONDUCTOR.

SPECIFICATION forming part of Letters Patent No. 472,643, dated April 12, 1892.

Application filed August 31, 1891. Serial No. 404,299. (No model.)

*To all whom it may concern:*

Be it known that I, WILLIAM R. PATTERSON, a citizen of the United States, residing at Chicago, in the county of Cook and State of Illinois, have invented a certain new and useful Improvement in Low-Capacity Cables, (Case No. 93,) of which the following is a full, clear, concise, and exact description, reference being had to the accompanying drawings, forming a part of this specification.

My invention relates to the manufacture of electric cables, and has for its object the securing of low inductive capacity, together with water-proof insulation. It is well known that air has a lower specific inductive capacity than any of the solid insulators. Advantage is taken of this fact in the manufacture of cables which are to be laid in underground conduits. In these cables the conductors are wound loosely with paper, cotton, or other fiber, and the core of conductors so insulated is protected by a sheath of lead. The spaces between the wires and the interstices of the insulating material are filled with dry air, and the capacity of such a cable is less than one-fifth that of a cable of the same size in which the wires are separately insulated with a solid water-proof material like gutta-percha or rubber and its compounds. In cables for long submarine lines the above-described construction is objectionable on account of the weight of the lead sheath, which must be itself protected by an armor, and on account of the loss of all the conductors in case of such injury to the sheath as would allow of the penetration of water. For use under such conditions I propose to insulate the conductors with paper or other fiber in the usual way, except that the entire length of wire is not covered, a length, say, of two feet in each fifty being left bare. The conductor thus partially covered is to be coated with gutta-percha or india-rubber, so that the outside diameter is uniform, the coating being thicker where the fibrous covering is left off and at these points coming directly upon the wire.

It is old in the art to coat wires with alternate layers of fibrous material and gutta-percha; but in this construction no provision is made against the penetration of water indefinitely along the fibrous layers in the direction of the length of the cable. The object of covering the wire with solid water-proof material in sections alternating with sections of the compound insulation is to prevent such longitudinal penetration of water, and thus to diminish the length of cable necessarily lost in case of injury to the insulation. There is no fixed proportion between the length of compound and solid insulated sections. The longer the aggregate of the compound-insulated sections the lower the capacity, and therefore the better the working of the cable. On the other hand, the longer and more frequent the solid insulated sections the less loss in case of injury; but I prefer the proportion of sections of fifty to one hundred feet of compound insulation alternately with sections of two feet of solid insulation. In cables containing more than one conductor I prefer to lay up the core so that the compound insulated sections of all the wires come together and the solid insulated sections together, so that if it is necessary to cut the cable the ends of the conductors will all be protected at the same place.

Referring to the drawings, Figure 1 is a longitudinal section of a single conductor insulated as described. Fig. 2 is a view of the cable, showing the end of the cable with three conductors. In Fig. 2 the conductors and the fibrous insulation surrounding the same are shown by the dotted lines.

Similar parts are shown by similar letters in both figures.

$a$ is the conductor; $b$, the fibrous covering; $c$, the water-proof insulation, which is shown at $d$ to lie directly upon and surrounding the conductor.

Having thus described my invention, what I claim as new, and desire to secure by Letters Patent, is—

1. An electrical conductor insulated with a composite covering of fibrous material and water-proof insulation, the water-proof insulation forming the entire outer coating of the covering and alternating with the fibrous insulation in longitudinal annular sections next the conductor.

2. A cable of insulated conductors, having sections of its length formed of conductors insulated with water-proof covering lying directly upon the surface of the conductors, alternating with sections in which fibrous insulation is next the conductors.

In witness whereof I hereunto subscribe my name this 5th day of August, A. D. 1891.

WILLIAM R. PATTERSON.

Witnesses:
EDITH M. ARNOLD,
GEORGE L. CRAGG.